(12) United States Patent
Lynch

(10) Patent No.: US 8,786,845 B2
(45) Date of Patent: Jul. 22, 2014

(54) SYSTEM AND METHOD OF GENERATING AND USING OPEN SKY DATA

(75) Inventor: James D. Lynch, Chicago, IL (US)

(73) Assignee: Navteq B.V., Veldhoven (NL)

( * ) Notice: Subject to any disclaimer, the term of this patent is extended or adjusted under 35 U.S.C. 154(b) by 851 days.

(21) Appl. No.: 12/756,338

(22) Filed: Apr. 8, 2010

(65) Prior Publication Data

US 2011/0249251 A1    Oct. 13, 2011

(51) Int. Cl.
*G01C 3/08*    (2006.01)

(52) U.S. Cl.
USPC .................................................. 356/139.01

(58) Field of Classification Search
USPC .................................................. 356/139.01
See application file for complete search history.

(56) References Cited

U.S. PATENT DOCUMENTS

| | | | | |
|---|---|---|---|---|
| 6,711,475 | B2 | 3/2004 | Murphy | 701/3 |
| 6,917,893 | B2 | 7/2005 | Dietsch et al. | 702/150 |
| 7,302,359 | B2 | 11/2007 | McKitterick | 702/155 |
| 2004/0130702 | A1 | 7/2004 | Jupp et al. | 356/5.01 |
| 2008/0208455 | A1* | 8/2008 | Hartman | 701/207 |
| 2009/0122295 | A1 | 5/2009 | Eaton | 356/5.01 |
| 2009/0225155 | A1* | 9/2009 | Hirotani | 348/61 |
| 2009/0254274 | A1* | 10/2009 | Kulik et al. | 701/213 |
| 2009/0262974 | A1* | 10/2009 | Lithopoulos | 382/100 |
| 2009/0322742 | A1 | 12/2009 | Muktinutalapati et al. | 345/420 |
| 2010/0017046 | A1 | 1/2010 | Cheung et al. | 701/2 |
| 2010/0020306 | A1 | 1/2010 | Hall | 356/50.1 |

FOREIGN PATENT DOCUMENTS

WO    WO 2009016242 A1 *    2/2009

OTHER PUBLICATIONS

Xin Chen; Stroila, M.; Lynch, J.; Alwar, N.; Kohlmeyer, B.; Bach, J.; Hui, R.; , "Towards next-generation map making," Multimedia and Expo, 2009. ICME 2009. IEEE International Conference on , vol., no., pp. 1676-1683, Jun. 28, 2009-Jul. 3, 2009 doi: 10.1109/ICME.2009.5202843 URL: http://ieeexplore.ieee.org/stamp/stamp.jsp?tp=&arnumber=5202843&isnumber.*
GNS 430(A) Pilot's Guide and Reference, Dec. 2009, 190-00140-00 Rev. P, Garmin.

* cited by examiner

Primary Examiner — Isam Alsomiri
Assistant Examiner — Vicente Rodriguez
(74) Attorney, Agent, or Firm — Lempia Summerfield Katz LLC

(57) ABSTRACT

A method and system for generating and using open sky data is described. A vehicle equipped with a range-finding device travels on a road network in a geographic region. The range-finding device transmits a pulse at a given position and obtains range data associated with the position. The system uses the range data to generate data representing visibility of open sky at the given position and at other positions along the road network. For example, the system may determine transmission angles of pulses transmitted at positions that did not encounter a physical object and then use the determined transmission angles to generate data representing visibility of open sky at these positions. The system then stores the data representing the visibility of open sky. The system then associates the data representing the visibility of open sky with data representing physical features.

23 Claims, 9 Drawing Sheets

SYSTEM AND METHOD OF GENERATING AND USING OPEN SKY DATA

BACKGROUND

Navigation systems are available that provide users with various navigation-related functions and features. For example, some navigation systems are able to determine an optimum route to travel along a road and/or a pedestrian pathway from an origin location to a destination location in a geographic region. Using input from a user, and optionally from equipment that can determine the user's location (such as a global positioning system (GPS)), the navigation system can examine various potential routes between the origin and destination locations to determine the optimum route.

The navigation system may then provide the user with information about the optimum route in the form of guidance that identifies the driving and/or walking maneuvers required to be taken by the user to travel from the origin to the destination location. The guidance may take the form of visual and/or audio instructions that are provided along the way as the user is traveling the route. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. The geographic database includes information about the represented geographic features, such as the positions of the roads, speed limits along portions of roads, address ranges along the road portions, turn restrictions at intersections of roads, direction restrictions, such as one-way streets, and so on. The geographic data may also include information about points of interest, such as restaurants, hotels, airports, gas stations, stadiums, police stations, and so on.

While navigation systems provide useful information to users, there continues to be room for new features and improvements.

SUMMARY

Disclosed herein is a method and system of generating and using open sky data. In one example, a method of generating data representing open sky includes: (a) obtaining range data associated with a given position; (b) using the range data associated with the given position to generate data representing visibility of open sky at the given position; and (c) storing into data storage the data representing the visibility of open sky at the given position. These steps may be repeated for various positions within a geographic region to generate data representing open sky in the geographic region. The data representing open sky in the geographic region may then be used for various purposes, such as to provide users with navigation-related functions and features.

The range data may take various forms. In one example, the range data may include data generated by a light detection and ranging system at the given position. In another example, the range data may include a plurality of data records, each representing attributes of a respective pulse transmitted by a range-finding device at the given position. In this respect, the attributes of the respective pulse may include a transmission angle of the pulse and a distance of a physical object encountered by the pulse. Other examples are possible as well.

The step of using the range data associated with the given position to generate data representing visibility of open sky at the given position may also take various forms. In one example, this step may include: (1) analyzing the obtained range data to determine transmission angles of pulses transmitted at the given position that did not encounter a physical object; (2) using the determined transmission angles of the pulses transmitted at the given position that did not encounter a physical object to determine visibility of open sky at the given position; and (3) generating data representing the determined visibility of the open sky at the given position. Additionally, before generating data representing the determined visibility of the open sky at the given position, this step may include using video data associated with the given position to verify the determined visibility of open sky at the given position. Other examples are possible as well.

The step of analyzing the obtained range data to determine transmission angles of pulses transmitted at the given position that did not encounter a physical object may also take various forms. In one example, this step may include: (1) for a given pulse transmitted at the given position, analyzing a data value indicating a distance of a physical object encountered by the given pulse; and (2) if the data value is a null, identifying a transmission angle of the given pulse as a transmission angle of a pulse that did not encounter a physical object. In another example, this step may include: (1) analyzing the obtained range data to identify gaps in the transmission angles of pulses transmitted at the given position that encountered a physical object; and (2) identifying transmission angles within the identified gaps as transmission angles of pulses that did not encounter a physical object. Other examples are possible as well.

The data representing the visibility of open sky at the given position may take various forms. In one example, this data may include data indicating each angle at which the open sky is visible from the given position. In anther example, this data may include data indicating one or more ranges of angles at which the open sky is visible from the given position. In yet another example, this data may include data indicating a distance of a physical object at each edge of each range of angles. In still another example, this data may include data indicating a visibility rating for each range of angles. Other examples are possible as well.

The step of storing into data storage the data representing the visibility of open sky at the given position may also take various forms. In one example, this step may include associating the data representing the visibility of open sky at the given position with data representing physical features (e.g., a road network) at the given position. In another example, this step may include storing into data storage the data representing the visibility of open sky at the given position only if the data representing the visibility of open sky at the given position indicates a significant change in the visibility of open sky from a previous position. Other examples are possible as well.

The method of generating data representing open sky may also include other features. In one example, the method may additionally include selecting the given position based on data representing a road network of a geographic region before obtaining range data associated with the given position. In another example, the method may additionally include providing the data representing the visibility of open sky at the given position to a navigation system.

In another aspect, a system may include a processor, data storage, and open sky data entities stored in the data storage and accessible by the processor, where each open sky data entity represents visibility of open sky at a respective position. Additionally, the system may include road-network data entities stored in the data storage and accessible by the processor, where each road-network data entity represents a road network at a respective position, and where the open sky data entities and the road-network data entities are associated based on position. Additionally yet, the system may include program instructions stored in the data storage and executable by the processor for using the open sky data entities to perform various functions, such as to determine an availability of GPS signals at one or more positions, an availability of radio signals at one or more positions, and/or exposure to weather conditions at one or more positions.

In yet another aspect, a tangible computer readable medium may have data stored thereon including: (1) open sky data entities each representing visibility of open sky at a respective position; and (2) geographic data entities each representing a geographic feature at a respective position, where the open sky data entities and the geographic data entities are associated based on position.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

DETAILED DESCRIPTION

The example embodiments described herein may determine and generate data representing the visibility of the open (i.e., unblocked or partially blocked) sky from various positions on the earth, such as positions on roads or pedestrian pathways or at points of interest. In this respect, the example embodiments may define not only the visibility of the open sky straight above a position, but also the visibility of the open sky (and, thus, the horizon) at all angles from the position. The example embodiments may also use the data representing the visibility of the open sky for various purposes, such as to determine GPS satellite reception, radio reception, and/or exposure to weather conditions (e.g., exposure to sun, rain, or snow) at various positions.

It should be understood that the arrangements described herein are set forth for purposes of example only. As such, those skilled in the art will appreciate that other arrangements and other elements (e.g., components, interfaces, functions, orders of functions, etc.) can be used instead, some elements may be added, and/or some elements may be omitted altogether. Further, those skilled in the art will appreciate that many of the elements described herein are functional elements that may be implemented as discrete or distributed components or in conjunction with other components, and in any suitable combination and location. Still further, various functions described herein as being performed by one or more entities may be carried out by hardware, firmware, and/or software. For instance, various functions may be carried out by a processor executing a set of program instructions written in any suitable programming language (e.g., C, C++, Java, etc.) and stored in memory.

I. Data Collection

Figure 1:
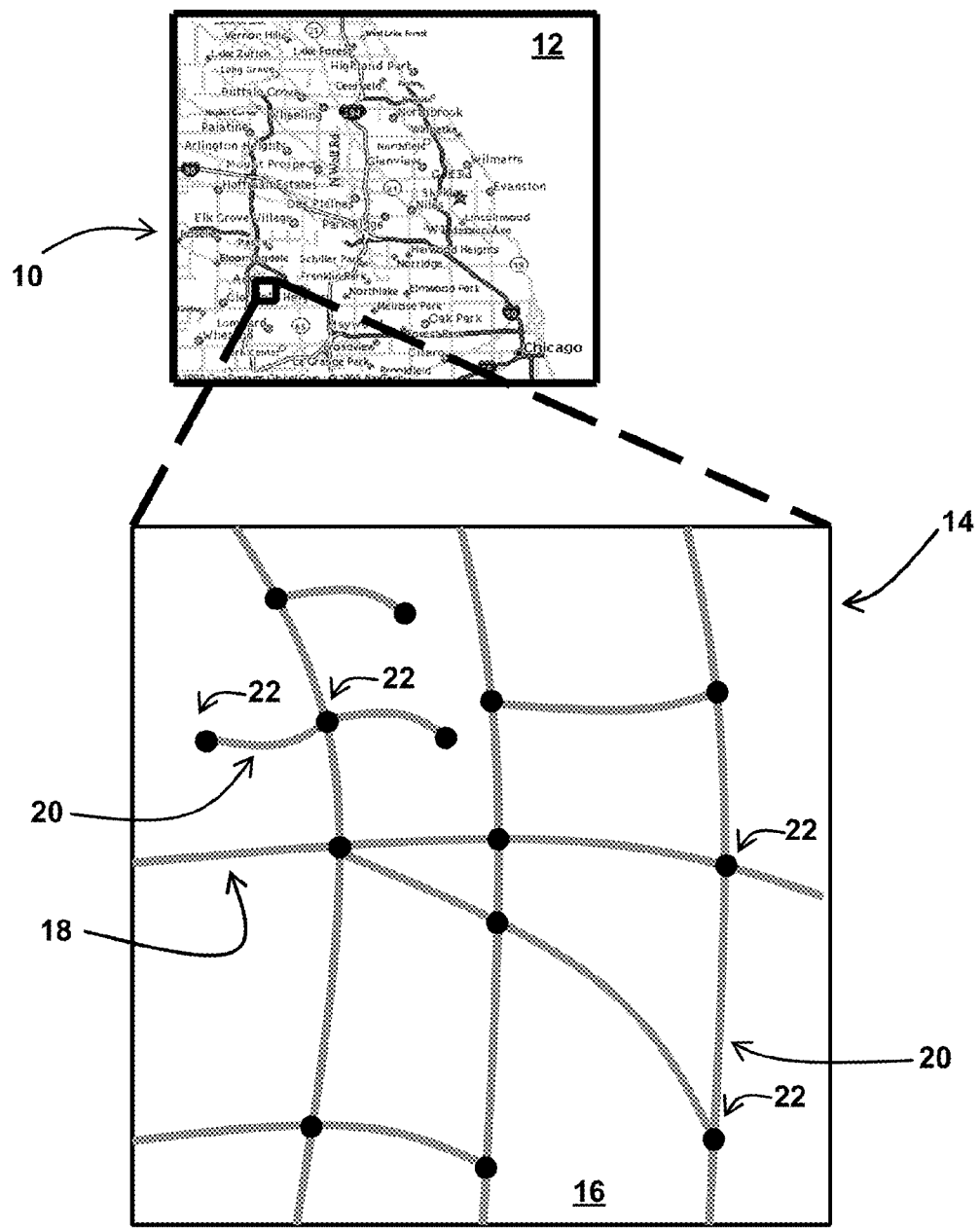
FIG. 1 shows a map of a geographic region.

FIG. 1 shows a map 10 of a geographic region 12. The geographic region 12 may correspond to a metropolitan or rural area, a state, a country, or combinations thereof, or any other area of comparable size. Located in the geographic region 12 are physical features, such as roads, points of interest (including businesses, facilities, etc.), pedestrian pathways (e.g., sidewalks, bike paths, etc.), lakes, rivers, railroads, and so on.

FIG. 1 also includes an enlarged map 14 of a portion 16 of the geographic region 12. The enlarged map 14 illustrates part of the road network 18 in the geographic region 12. The road network 18 includes, among other things, roads and intersections located in the geographic region 12. As shown in the portion 16, each road in the geographic region 12 is composed of one or more road segments 20. A road segment 20 represents a portion of the road. Each road segment 20 is shown to have associated with it two nodes 22; one node represents the point at one end of the road segment and the other node represents the point at the other end of the road segment. The node 22 at either end of a road segment may correspond to a location at which the road meets another road, i.e., an intersection, or where the road dead-ends.

In order to provide navigation-related functions and features in the geographic region 12, a party (e.g., a map developer) may first collect data about the geographic region 12. In this respect, the party may use vehicles traveling along the road network 18 of the geographic region 12 to collect data about the geographic region 12. It should be understood, however, that the party may additionally or alternatively employ other systems and methods to collect data about the geographic region 12 (e.g., data collection equipment affixed to a tripod or carried by pedestrians, vehicles traveling on pedestrian pathways, etc.) that are within the scope of the example embodiments described herein.

Figure 2:
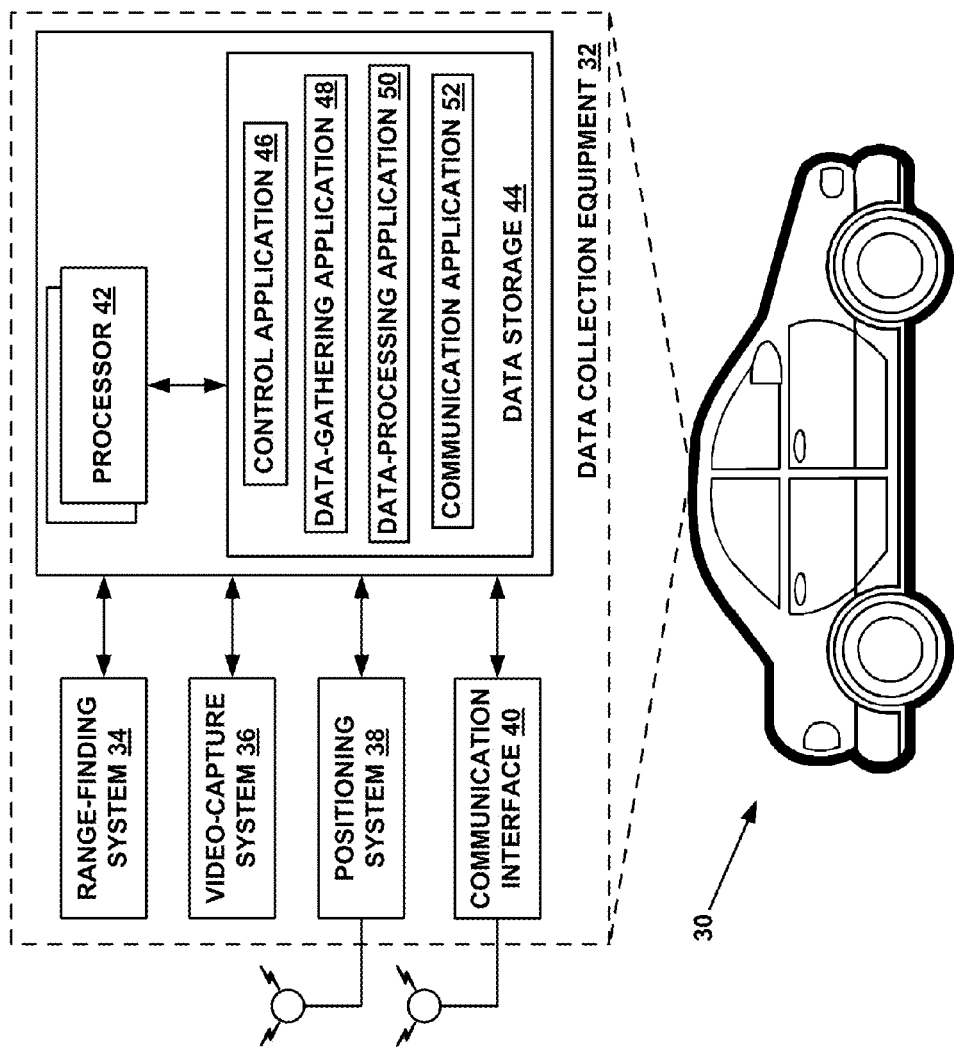
FIG. 2 shows a vehicle with data collection equipment that is capable of collecting data about the geographic region of FIG. 1, according to an example embodiment.

FIG. 2 shows a vehicle 30 with data collection equipment 32 that is capable of collecting data about the geographic region 12, according to an example embodiment. As shown, the data collection equipment 32 includes a range-finding system 34, an image-capture system 36, a positioning system 38, and a communication interface 40, each operatively coupled to a processor 42 and data storage 44. The data collection equipment 32 may include other components as well. The components of the data collection equipment 32 may be arranged in various manners. In one aspect, components may be physically separate from one another, in which case the components may be linked together via a system bus, network, or other connection mechanism. In another aspect, components may be physically integrated together in whole or in part. Many other configurations are possible as well.

The range-finding system 34 may function to scan and generate range data representing an area surrounding the vehicle's position. In this respect, the range-finding system 34 may continuously generate range data as the vehicle 30 travels along the road network 18. The range-finding system 34 and range data may take various forms.

In one embodiment, the range-finding system 34 may take the form of a light detection and ranging (LIDAR) system that uses laser pulses to scan the area surrounding the vehicle's position, such as a HDL-64E system manufactured by Velodyne Lidar Inc. or an LMS2xx system manufactured by SICK AG. The LIDAR system may transmit laser pulses radially in various directions from a reference point on the range-finding system 34. For example, the LIDAR system may transmit laser pulses at a nearly continuous range of angles (e.g., every 0.1°) in one or more two-dimensional spaces (e.g., planes). In this respect, the LIDAR system may include a bank of laser transmitters (e.g., 64 transmitters) that continuously rotates around the reference point (e.g., at a rate of 10 rotations per second). During a rotation, each laser transmitter in the bank may transmit a plurality of laser pulses in a respective planar space, with each laser pulse having a respective angle about the LIDAR rotation axis. Each laser pulse transmitted by the LIDAR system may also have a non-planar, three-dimensional, conic transmission angle with the laser transmitter tilted relative to the LIDAR rotation axis. Other examples are possible as well.

Figure 3:
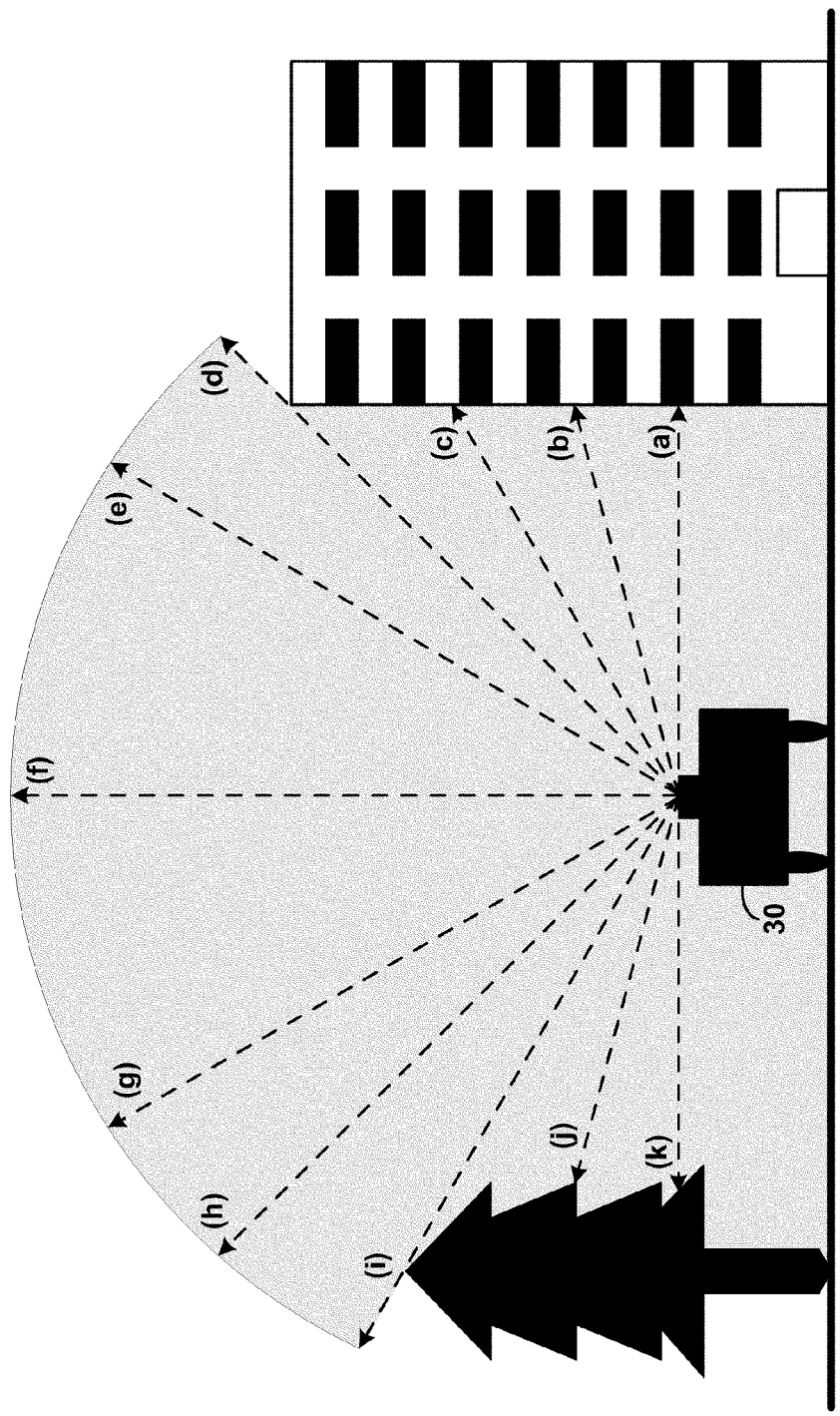
FIG. 3 is rear view of a light detection and ranging system operating in the vehicle of FIG. 2.

FIG. 3 is rear view of an example LIDAR system operating in the vehicle 30 as it is positioned on a road with a tree on a left side and a building on a right side. As shown, the example LIDAR system may transmit laser pulses at a nearly continuous range of angles in a plane perpendicular to the travel direction of the vehicle 30. For purposes of illustration, FIG. 3 also highlights example laser pulses (a)-(k), which the example LIDAR system transmits at angles of 90°, 75°, 60°, 45°, 30°, 0, −30°, −45°, −60°, −75°, and −90° respectively.

For each laser pulse transmitted by a given laser transmitter, the LIDAR system may then monitor whether the laser pulse is reflected back to the LIDAR system by a physical object within range of the LIDAR system. In this respect, if the LIDAR system detects a reflection of the laser pulse, the LIDAR system may measure attributes of the laser pulse's reflection, such as a time between transmission of the laser pulse and detection of the reflection and/or an intensity of the reflection. Based on the time measurement, the LIDAR system may also calculate a distance (typically within a few centimeters) of an encountered physical object relative to the reference point. If the LIDAR system does not detect a reflection of the laser pulse, however, the LIDAR system may consider all attributes of the laser pulse's reflection to be null (e.g., 0). For example, with reference to FIG. 3, the example LIDAR system may calculate the distance of the building encountered by example laser pulses (a)-(c) as 10 meters, 10.7 meters, and 13.5 meters respectively, the distance of the tree encountered by the example laser pulses (j)-(k) as 10.3 meters and 10.5 meters respectively, and the distance of a physical object encountered by the laser pulses (d)-(i) as 0 meters.

After monitoring for and determining attributes of the laser pulse's reflection, the LIDAR system may generate range data representing attributes of the laser pulse. For example, the LIDAR system may generate a data record (or "entity" or "entry") for the laser pulse that includes data indicating an identity of the laser transmitter from which the laser pulse originated, a rotation angle of the laser transmitter during transmission of the laser pulse, a distance of a physical object encountered by the laser pulse (if any), and/or an intensity of the laser pulse's reflection (if any). Other examples are possible as well.

From each position of the vehicle 30, the LIDAR system may transmit and generate range data for a plurality of laser pulses with respective transmission angles relative to the LIDAR system. This range data, which represents an area surrounding the vehicle 30, may then be processed along with other data (e.g., position data for the vehicle 30, etc.) to generate geographic data representing the geographic region 12. For example, a party may process range data indicating physical features surrounding the vehicle 30 (e.g., range data records that include a non-null distance value) to generate geographic data representing physical features at various positions in the geographic region 12. As another example, as discussed below, a party may process range data indicating a lack of physical features surrounding the vehicle 30 (e.g., range data records that include a null distance value) to generate geographic data representing the visibility of the open sky at various positions in the geographic region 12. Other examples are possible as well.

The video-capture system 36 may function to capture and generate video data representing an area surrounding the vehicle 30. In this respect, the video-capture system 36 may continuously generate video data as the vehicle 30 travels along the road network 18. The video-capture system 36 and the video data may take various forms. In one embodiment, the video-capture system 36 may take the form of a video camera with multiple lenses of various orientations that is capable of capturing the area surrounding the vehicle 30 in all directions, such as a Ladybug® 3 spherical digital video camera manufactured by Point Grey Research, Inc. In this respect, the video data may take the form of 360° panoramic video frames. As discussed below, a party may use the video data during processing of the range data to generate geographic data representing the visibility of the open sky at various positions in the geographic region 12.

The positioning system 38 may function to track and generate position data representing a position of the vehicle 30. (It should be understood, however, that the position data for the vehicle may alternatively be derived from the range data and/or the video data). In this respect, the positioning system 38 may continuously generate position data as the vehicle 30 travels along the road network 18. The positioning system 38 may employ any technology now known or later developed, including GPS-type technology, dead reckoning-type technology, or a combination of these or other technologies, all of which are known in the art. Further, the positioning system 38 may include various components, including a GPS receiver, an inertial measurement unit (IMU), wheel-rotation sensors, steering-direction sensors, and/or any other device that enables tracking of the vehicle's position. Further yet, the position data may take various forms, including data indicating geographic coordinates (latitude, longitude, and altitude), direction, orientation, and/or speed of the vehicle 30 for instance. In one example, the positioning system 38 may be part of an IP-S2 system manufactured by Topcon Positioning Systems, Inc. As discussed below, a party may use the position data during processing of the range data to generate geographic data representing the visibility of the open sky at various positions in the geographic region 12.

The communication interface 40 may function to communicatively couple the data collection equipment 32 to one or more other devices. In this respect, the communication interface 40 may take the form of one or more interfaces that provide for wireless and/or wired communication with another device, such as an Ethernet interface, a serial bus interfaces (e.g., Firewire, USB 2.0, etc.), a chipset and antenna adapted to facilitate wireless communication according a desired protocol, or any other such interfaces now known or later developed. Other configurations are also possible.

The processor 42 may function to execute or interpret program instructions (which may be arranged into an application) that enable the processor 42 to carry out various tasks, such as tasks related to the collection of data about the geographic region 12 for instance. In this respect, the processor 42 may take the form of one or more processor components, such as general-purpose processors (e.g., a microprocessor), application-specific processors (e.g., an application-specific integrated circuit (ASIC) or digital signal processor (DSP)), programmable logic devices (e.g., a field programmable gate array (FPGA)), or other processor components now known or later developed. Other configurations are possible as well.

The data storage 44 may function to store various types of program instructions and data that can be read by the processor 42, such as applications and data generated by the range-finding system 34, the video-capture system 36, and the positioning system 38, for instance. In this respect, the data storage 44 may take the form of one or more data storage mediums, such as volatile data storage mediums (e.g., random access memory (RAM), registers, and/or cache) and/or non-volatile data storage mediums (e.g., read only memory (ROM), a hard disk drive, a solid state drive, flash memory, an optical storage device, and/or a floppy disk). Some data storage mediums may be integrated in whole or in part with the processor 42. Further, some data storage mediums may be external to and/or removable from the data collection equipment 32, and may interface with the data collection equipment 32 in various manners (e.g., via the communication interface 40, a drive, or a reader). Other configurations are possible as well.

The data storage 44 may contain one or more applications that enable the processor 42 to perform various tasks related to the collection of data about the geographic region 12. The one or more applications may be stored in various components of the data storage 44. For example, the one or more applications may be stored in a non-volatile data storage medium (e.g., a hard disk drive or a removable storage component installed in a drive) and then loaded into a volatile data storage medium (e.g., RAM) when operated on by the processor 42. Other examples are possible as well. In one embodiment, the one or more applications may be stored in a different data storage medium from the data generated by the range-finding system 34, the video-capture system 36, and the positioning system 38.

In one aspect, the data storage 44 may contain a control application 46 that enables the processor 42 to control the range-finding system 34, the video-capture system 36, and/or the positioning system 38. For example, the processor 42 executing the control application 46 may initiate and cease data collection by the range-finding system 34, the video-capture system 36, and/or the positioning system 38. As another example, the processor 42 executing the control application 46 may adjust collection settings (e.g., collection rate) for the range-finding system 34, the video-capture system 36, and/or the positioning system 38. Other examples are possible as well.

In another aspect, the data storage 44 may contain a data-gathering application 48 that enables the processor 42 to obtain and store data from the range-finding system 34, the video-capture system 36, and/or the positioning system 38. For example, the processor 42 executing the data-gathering application 48 may receive data from the range-finding system 34, the video-capture system 36, and/or the positioning system 38. As another example, the processor 42 executing the data-gathering application 48 may store data from the range-finding system 34, the video-capture system 36, and/or the positioning system 38 (in either processed or unprocessed form) into the data storage 44. Other examples are possible as well.

In yet another aspect, the data storage 44 may contain a data-processing application 50 that enables the processor 42 to process data obtained from the range-finding system 34, the video-capture system 36, and/or the positioning system 38. For example, the processor 42 executing the data-processing application 50 may associate data generated by the range-finding system 34, the video-capture system 36, and/or the positioning system 38 by applying capture timestamps to that data. In another example, the processor 42 executing the data-processing application 50 may organize data obtained from the range-finding system 34, the video-capture system 36, and/or the positioning system 38 for storage and/or transmission. Other examples are possible as well.

In a further aspect, the data storage 44 may contain a communication application 52 that enables the processor 42 to communicate with other devices via the communication interface 40. In one example, the processor 42 executing the communication application 52 may receive messages from another device via the communications interface 40, such as messages that request range data, video data, and/or position data. In another example, the processor 42 executing the communication application 52 may send messages to another device via the communications interface 40, such as messages that include range data, video data, and/or position data (in either processed or unprocessed form). Other examples are possible as well.

II. Generation of Geographic Data

Using the vehicle 30 described above (and/or another system), a party may collect range data, video data, and position data for at least a portion of the geographic region 12. Once that collection is complete, a party (e.g., the collecting party or another party) may use the collected data to generate geographic data, potentially for incorporation into a geographic database and/or use by a navigation system. In this respect, the party may generate the geographic data on a computing device, such as a personal computer or a server computer.

Figure 4:
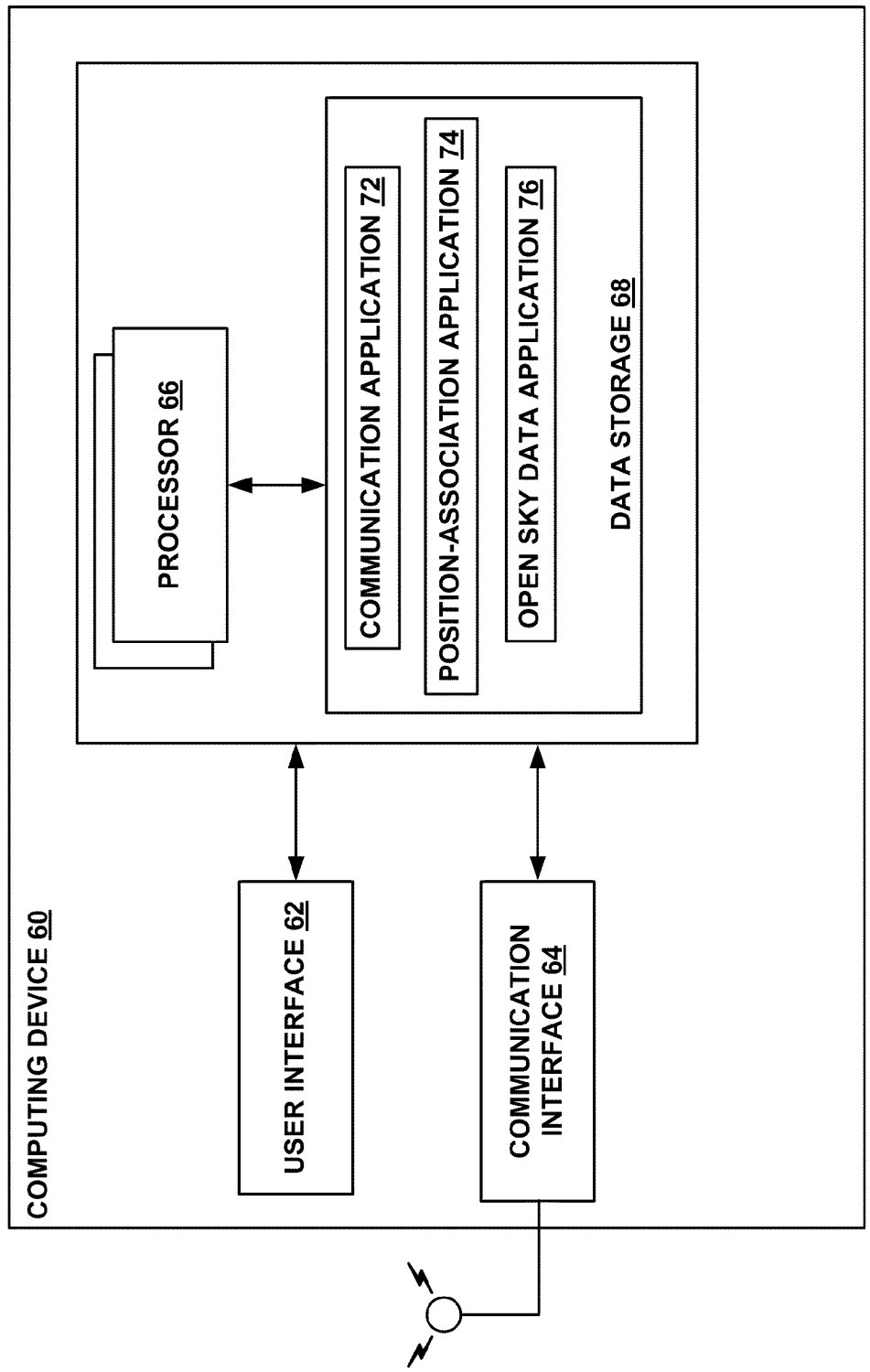
FIG. 4 is a block diagram of a computing device configured to generate geographic data, according to an example embodiment.

FIG. 4 is a block diagram of a computing device 60 configured to generate geographic data, according to an example embodiment. As shown, the computing device 60 may include a user interface 62 and a communication interface 64, each operatively coupled to a processor 66 and data storage 68. The computing device 60 may include other components as well.

The user interface 62 may function to facilitate user interaction with the computing device 60, such as by allowing a user to input information into the computing device 60 and obtain information from the computing device 60. In this respect, the user interface 62 may include or provide connectivity to various input components, such as a keyboard, a mouse, and/or a microphone for instance. The user interface 62 may also include or provide connectivity to various output components, such as a display screen and/or a speaker for instance. The user interface 62 may include or provide connectivity to other components for facilitating user interaction with the computing device 60 as well.

The communication interface 64 may function to communicatively couple the computing device 60 to one or more other devices, such as the data collection equipment 32 and/or one or more navigation systems for instance. In this respect, the communication interface 64 may take the form of one or more interfaces that provide for wireless and/or wired communication with another device, such as an Ethernet interface, a serial bus interfaces (e.g., Firewire, USB 2.0, etc.), a chipset and antenna adapted to facilitate wireless communication according a desired protocol, or any other such interfaces now known or later developed. Other configurations are also possible.

The processor 66 may function to execute or interpret program instructions (which may be arranged into an application) that enable the processor 66 to carry out various tasks, such as tasks related to generating geographic data for instance. In this respect, the processor 66 may take the form of one or more processor components, such as general-purpose processors (e.g., a microprocessor), application-specific processors (e.g., an ASIC or DSP), programmable logic devices (e.g., a FPGA), or other processor components now known or later developed. Other configurations are possible as well.

The data storage 68 may function to store various types of program instructions and data that can be read by the processor 66, such as applications, data received from the data collection equipment 32, and geographic data, for instance. In this respect, the data storage 68 may take the form of one or more data storage mediums, such as volatile data storage mediums (e.g., RAM, registers, and/or cache) and/or non-volatile data storage mediums (e.g., ROM, a hard disk drive, a solid state drive, flash memory, an optical storage device, and/or a floppy disk). Some data storage mediums may be integrated in whole or in part with the processor 66. Further, some data storage mediums may be external to and/or removable from the computing device 60, and may interface with the computing device 60 in various manners (e.g., via the communication interface 64, a drive, or a reader). Other configurations are possible as well.

The data storage 68 may contain one or more applications that enable the processor 66 to perform various tasks related to generating geographic data. The one or more applications may be stored in various components of the data storage 68. For example, the one or more navigation applications may be stored in a non-volatile data storage medium (e.g., a hard disk drive or a removable storage component installed in a drive) and then loaded into a volatile data storage medium (e.g., RAM) when operated on by the processor 66. Other examples are possible as well.

In one aspect, the data storage 68 may contain a communication application 72 that enables the processor 66 to communicate with other devices via the communication interface 64. In one example, the processor 66 executing the communication application 72 may receive messages from another device via the communications interface 64, such as messages from the data collection equipment 32 that include range data, video data, and position data or messages from navigation systems that request geographic data. In another example, the processor 66 executing the communication application 72 may send messages to another device via the communications interface 64, such as messages to the data collection equipment 32 that request range data, video data, and position data or messages to navigation systems that include geographic data. Other examples are possible as well.

In another aspect, the data storage 68 may contain a position-association application 74 that enables the processor 66 to associate range data and video data received from the data collection equipment 32 with respective positions where the data collection equipment 32 collected that data. The processor 66 executing the position-association application 74 may perform the association in various ways. In one example, the processor 66 executing the position-association application 74 may first correlate the range data and video data with the position data, such as by using capture timestamps or sequencing and collection rates of the data. Thereafter, the processor 66 executing the position-association application 74 may use the position data and perhaps other data to determine the respective positions with which to associate the range data and video. Other examples are possible as well. As a result of the processor 66 executing the position-association application 74, each range data record and video data record may include or link to a position identifier (e.g., geographic coordinates and perhaps orientation).

The position-association application 74 may also enable the processor 66 to transform the range data from a local coordinate system relative to the range-finding system 34 to a world coordinate system. The processor 66 executing the position-association application 74 may perform the transformation in various manners. In one example, the processor 66 executing the position-association application 74 may first determine the three-dimensional transmission angle of each laser pulse relative to the range-finding system 34 based on a static orientation of the originating laser transmitter and a rotation angle of the originating laser transmitter during transmission of the laser pulse. The processor 66 executing the position-association application 74 may then determine the three-dimensional transmission angle of the laser pulse in the world coordinate system based on the three-dimensional transmission angle of the laser pulse relative to the range-finding system 34, the orientation of the range-finding system 34 relative to the positioning system 38, and the orientation of the positioning system 38 in world coordinates as indicated by the associated position data. Other examples are possible as well.

In yet another aspect, the data storage 68 may contain an open sky data application 76 that enables the processor 66 to generate and store data representing open sky in the geographical area 12. The processor 66 executing the open sky data application 76 may perform the open sky data generation in various ways.

Figure 5:
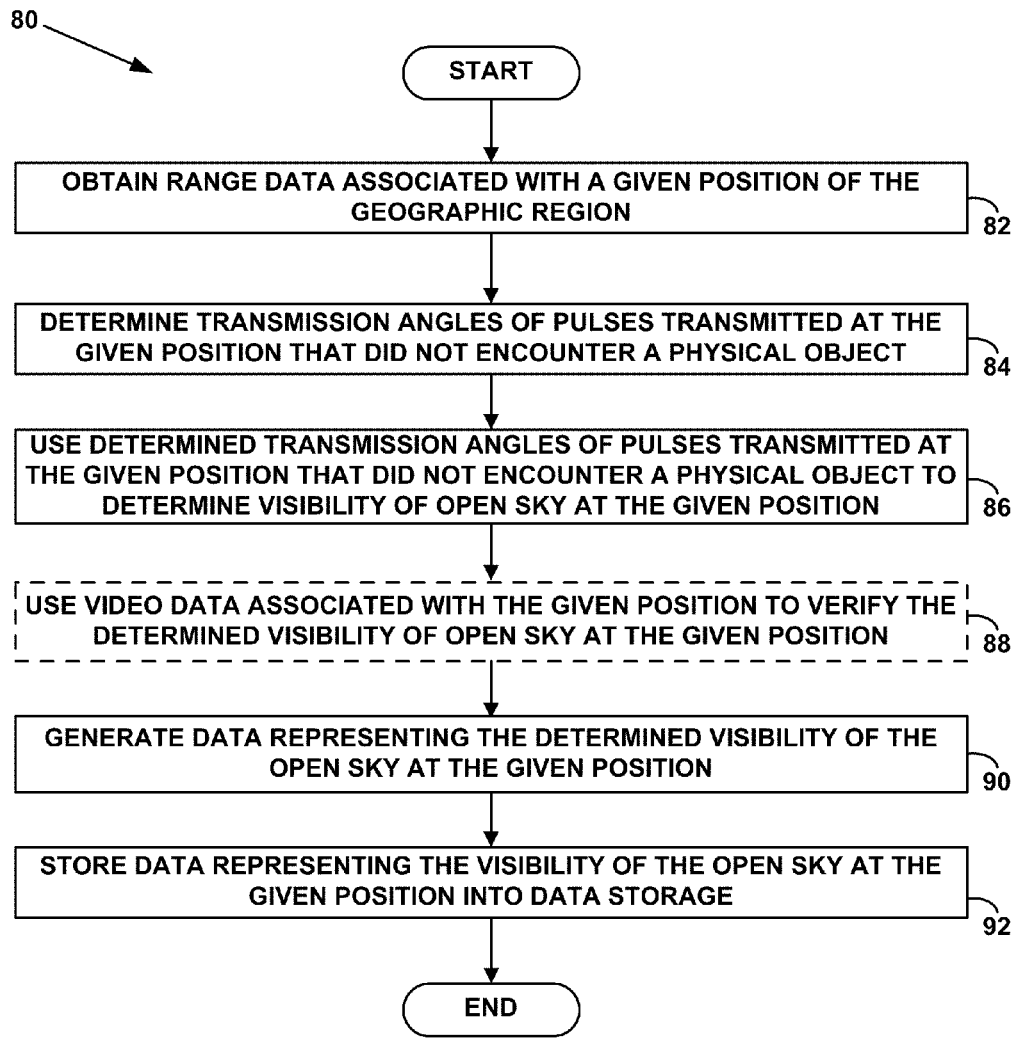
FIG. 5 is a flow chart depicting a method of generating open sky data, according to an example embodiment.

FIG. 5 is a flow chart depicting a method 80 of generating open sky data, according to an example embodiment. For purposes of illustration, the following description will assume that the processor 66 carries out the method 80 while executing the open sky data application 76. Further, the following description will assume that the computing device 60 and/or another device (e.g., the data collection equipment 32) have previously performed position-association on the data collected by the data collection equipment 32.

At block 82, the processor 66 executing the open sky data application 76 may first obtain range data associated with a given position of the geographic region 12, such as by accessing the data storage 68 and/or receiving the range data from the data collection equipment 32 via the communication interface 64. For example, the processor 66 executing the open sky data application 76 may obtain range data associated with the position of the vehicle 30 in FIG. 3. The obtained range data may include multiple range data records (or "entities" or "entries"), each representing attributes of a respective pulse transmitted by the range-finding device 34 at the given position. In turn, each range data record may include at least data values indicating an orientation of the pulse and a distance of a physical object encountered by the pulse (if any) relative to a reference point.

In one example, the obtained range data may include all range data records associated with the given position. In another example, the obtained range data may include only range data records associated with the given position that include null distance values, or only range data records associated with the given position that include non-null distance values. In either case, because the range-finding system's transmitters may have rotated multiple times while at the given position, the obtained range data may include range data records for a plurality of pulses having the same transmission angle. Other examples are possible as well.

At block 84, the processor 66 executing the open sky data application 76 may determine the transmission angles at which pulses transmitted from the given position did not encounter a physical object. The processor 66 executing the open sky data application 76 may perform this determination in various manners.

In one aspect, the processor 66 executing the open sky data application 76 may perform this determination based on the obtained range data for pulses transmitted at the given position that did not encounter a physical object. In this respect, if necessary, the processor 66 executing the open sky data application 76 may first analyze the obtained range data to identify pulses transmitted at the given position that did not encounter a physical object. For example, the processor 66 executing the open sky data application 76 may: (a) analyze the data value indicating a distance of a physical object encountered by each pulse transmitted at the given position; and (b) if this data value is a null (e.g., 0), identify the pulse as one that did not encounter a physical object. Other examples are possible as well.

The processor 66 executing the open sky data application 76 may then determine transmission angles of the pulses transmitted at the given position that did not encounter a physical object. For example, the processor 66 executing the open sky data application 76 may access the data value indicating the transmission angle of each pulse transmitted at the given position that did not encounter a physical object. Other examples are possible as well. With reference to FIG. 3, the processor 66 executing the open sky data application 76 may determine that pulses (d)-(i) with angles of 45°, 30°, 0°, −30°, −45°, and −60° respectively within a plane perpendicular to the travel direction of the vehicle 30 did not encounter a physical object.

In another aspect, the processor 66 executing the open sky data application 76 may perform this determination based on the obtained range data for pulses transmitted at the given position that encountered a physical object. In this respect, if necessary, the processor 66 executing the open sky data application 76 may first analyze the obtained range data to identify pulses transmitted at the given position that encountered a physical object. For example, the processor 66 executing the open sky data application 76 may: (a) analyze the data value indicating a distance of a physical object encountered by each pulse transmitted at the given position; and (b) if this data value is anything other than a null, identify the pulse as one that encountered a physical object. Other examples are possible as well.

The processor 66 executing the open sky data application 76 may then analyze the obtained range data for the pulses transmitted at the given position that encountered a physical object, to identify gaps in the transmission angles of these pulses. In turn, the processor 66 executing the open sky data application 76 may determine that the transmission angles within the identified gaps are transmission angles of pulses transmitted at the given position that did not encounter a physical object. The processor 66 executing the open sky data application 76 may perform this determination in other manners as well.

In yet another aspect, the processor 66 executing the open sky data application 76 may perform this determination based on both the obtained range data for pulses transmitted at the given position that did not encounter a physical object and the obtained range data for pulses transmitted at the given position that encountered a physical object. In this respect, the processor 66 executing the open sky data application 76 may first organize the range data based on transmission angle, such that the obtained range data associated with each represented transmission angle is grouped together. The processor 66 executing the open sky data application 76 may then analyze the obtained range data for each represented transmission angle, to determine a number of pulses having a transmission angle that did not encounter a physical object and a number of pulses having transmission angle that encountered a physical object. Based on this analysis, the processor 66 executing the open sky data application 76 may determine whether the transmission angles are ones at which none, some, or all pulses encountered a physical object.

For example, the processor 66 executing the open sky data application 76 may identify a transmission angle at which 75% or more of pulses did not encounter a physical object as one at which pulses did not encounter a physical object. As another example, the processor 66 executing the open sky data application 76 may identify a transmission angle at which 75% or more of pulses encountered a physical object as one at which pulses encountered a physical object. As still another example, the processor 66 executing the open sky data application 76 may identify a transmission angle at which 25-75% of pulses encountered a physical object as one at which pulses occasionally encountered a physical object.

At block 86, the processor 66 executing the open sky data application 76 may use the determined transmission angles of the pulses that did not encounter a physical object (and perhaps the determined transmission angles of the pulses that occasionally encountered a physical object) to determine visibility of open sky at the given position. In one aspect, the processor 66 executing the open sky data application 76 may determine that each transmission angle at which a pulse did not encounter a physical object is an angle at which the open sky is fully visible.

For example, with reference to FIG. 3, the processor 66 executing the open sky data application 76 may determine that the open sky is visible at angles of 45°, 30°, 0°, −30°, −45°, and −60° within a plane that is perpendicular to the travel direction of the vehicle 30. In another aspect, the processor 66 executing the open sky data application 76 may determine that each transmission angle at which a pulse occasionally encountered a physical object is an angle at which the open sky is partially visible. The processor 66 executing the open sky data application 76 may determine visibility of open sky at the given position in other manners as well.

At block 88, the processor 66 executing the open sky data application 76 may use the video data associated with the given position to verify the determined visibility of open sky at the given position. In this respect, the processor 66 executing the open sky data application 76 may perform the verification using any technique now known or later developed. Further, block 88 is depicted in dashed lines to show that the processor 66 executing the open sky data application 76 may perform the verification optionally. In one aspect, the processor 66 executing the open sky data application 76 may perform the verification for positions at which physical features outside a range of the range-finding system 34 may obscure visibility of open sky (e.g., positions surrounded by tall buildings). The processor 66 executing the open sky data application 76 may perform the verification in other circumstances as well.

At block 90, the processor 66 executing the open sky data application 76 may generate data representing the determined visibility of the open sky at the given position. In one aspect, the data representing the determined visibility of the open sky at the given position may include a value for each angle at which the open sky is visible from the given position. For example, with reference to FIG. 3, the data representing the determined visibility of the open sky at the given position may include angle values of 45°, 30°, 0°, −30°, −45°, and −60°.

In another aspect, to reduce the required data storage space for the open sky data, the data representing the determined visibility of the open sky at the given position may include data indicating one or more ranges of angles at which the open sky is visible from the given position. The data indicating each range may include two angle values, each defining one end of the range of angles at which the open sky is visible from the given position. For example, with reference to FIG. 3, the data representing the determined visibility of the open sky at the given position may include a range defined by angle values of 45° and −60°.

In yet another aspect, the data representing the determined visibility of the open sky at the given position may include data indicating a distance of a physical object at each edge of an open sky angle range. For example, with reference to FIG. 3, the data representing the determined visibility of the open sky at the given position may include a distance of the building at an angle of 44.9° and a distance of the tree at an angle of −60.1°.

In still another aspect, the data representing the determined visibility of the open sky at the given position may include data indicating a visibility rating associated with the angles at which the open sky is visible from the given position. For example, for angles at which the open sky is determined to be only partially visible, the data representing the determined visibility of the open sky may include a rating of that partial visibility. The data representing the determined visibility of the open sky at the given position may take other forms as well.

At block 92, the processor 66 executing the open sky data application 76 may store the data representing the visibility of the open sky at the given position into the data storage 68. In one aspect, the processor 66 executing the open sky data application 76 may store the data representing the visibility of the open sky at the given position in an open sky data record that also contains an identifier of the given position. The processor 66 executing the open sky data application 76 may store the data representing the visibility of the open sky at the given position in other manners as well.

After generating and storing the open sky data for the given position, the processor 66 executing the open sky data application 76 may repeat the above process for various other positions in the geographic region 12, which may be selected according to various criteria. In one aspect, the processor 66 executing the open sky data application 76 may generate and store open sky data for all positions at which data was collected. In another aspect, to reduce the required data storage space for the open sky data, the processor 66 executing the open sky data application 76 may generate and/or store open sky data for less than all positions at which data was collected.

For example, the processor 66 executing the open sky data application 76 may generate and store open sky data for specific positions on the road network 18, such as at each node 22 and positions at predefined distances along road segments 20 (e.g., every 5 meters). As another example, the processor 66 executing the open sky data application 76 may generate open sky data for all positions on the road network 18 at which data was collected, but may only store open sky data for positions at which the open sky data indicates a significant change in visibility of the open sky (e.g., a change of 5° in one of the end point angles of the visibility range). The processor 66 executing the open sky data application 76 may employ similar selection criteria for positions off the road network 18 (e.g., pedestrian pathways). Other examples are possible as well.

Referring back to FIG. 4, the processor 66 executing the open sky data application 76 may also perform the open sky data generation in other ways. For example, the processor 66 executing the open sky data application 76 may generate the open sky data based on GPS signal strengths collected by the data collection equipment 32 (e.g., via the positioning system 28). Other examples are possible as well.

After the computing device 60 generates and stores the open sky data, the open sky data may be used for various purposes. In one example, as described below, the open sky data may be incorporated into a geographic database. In another example, as described below, the open sky data may be used to provide users with navigation-related functions and features. In yet another example, the open sky data may be used to improve map generation (e.g., by identifying a location of an overpass). In still another example, the open sky data may be used to identify potential locations for solar cell collectors. Many other examples are possible as well.

The data storage 68 may contain other applications as well. For example, the data storage 68 may contain a road-network data application that enables the processor 66 to generate and store data representing the road network 18 in the geographic region 12. In another example, the data storage 68 may contain a points-of-interest data application that enables the processor 66 to generate and store data representing data representing points of interest surrounding the road network 18 in the geographic region 12, such as businesses and facilities. In still another example, the data storage 68 may contain a pedestrian pathway data application that enables the processor 66 to generate and store data representing sidewalks, bike paths, etc. Other examples are possible as well.

III. Geographic Database

Figure 6:
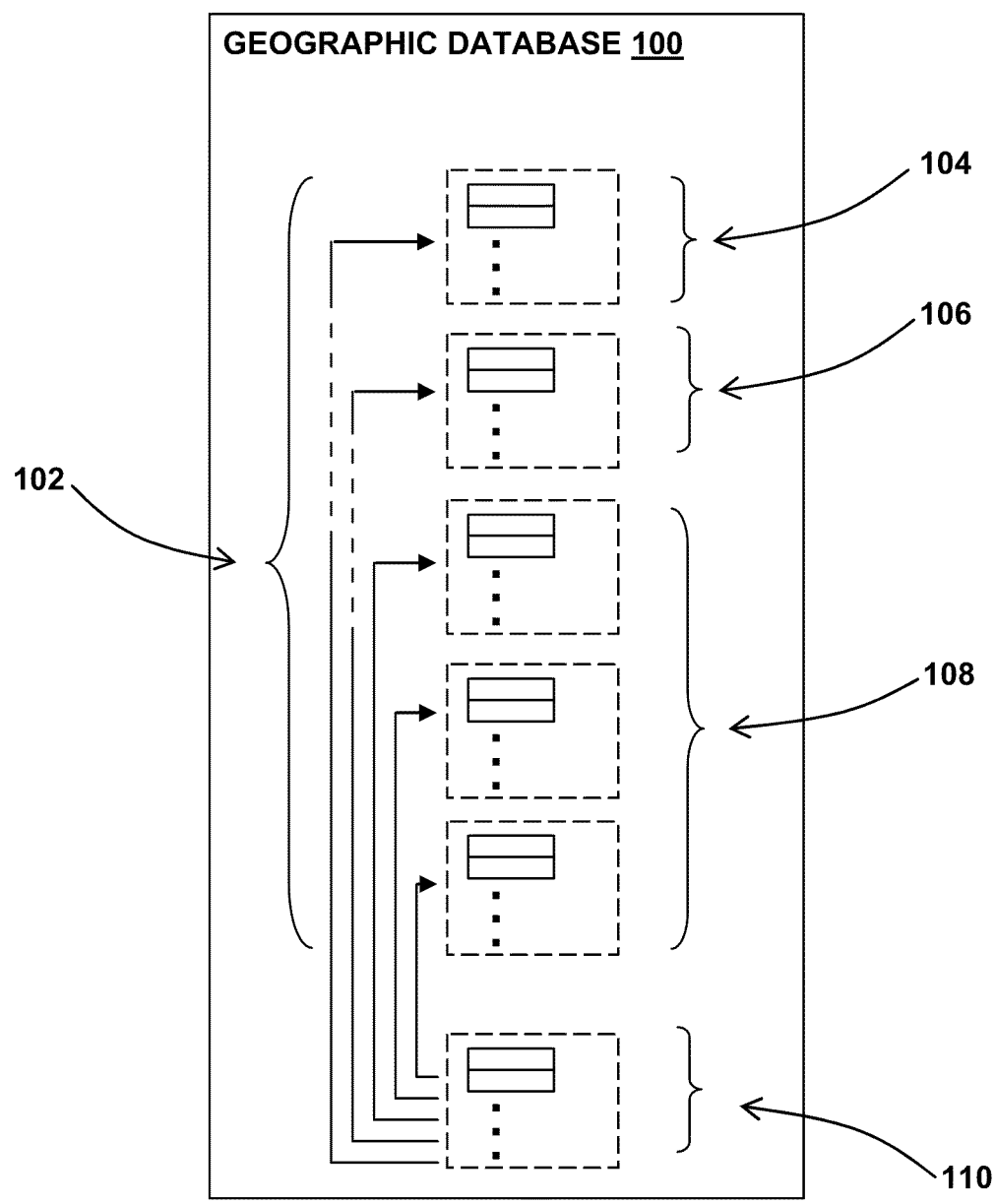
FIG. 6 depicts a geographic database, according to an example embodiment.

As described above, the geographic data generated by the computing device 60 may be incorporated into a geographic database. FIG. 6 depicts a geographic database 100, according to an example embodiment. The geographic database 100 may be maintained in one or more data storage mediums, such as data storage of a computing device similar to the computing device 60 described above. As shown, the geographic database 100 may contain data 102 that represents geographic features in the geographic region 12.

In one aspect, the geographic database 100 may contain data that represents the road network 18. For example, as shown, the geographic database 100 may contain at least one road segment database record 104 (also referred to as "entity" or "entry") for each road segment 20 in the geographic region 12. As another example, the geographic database 100 may contain a node database record 106 (or "entity" or "entry") for each node 22 in the geographic region 12. The terms "nodes" and "segments" represent only one terminology for describing these physical geographic features, and other terminology for describing these features is intended to be encompassed within the scope of these concepts.

Figure 7:
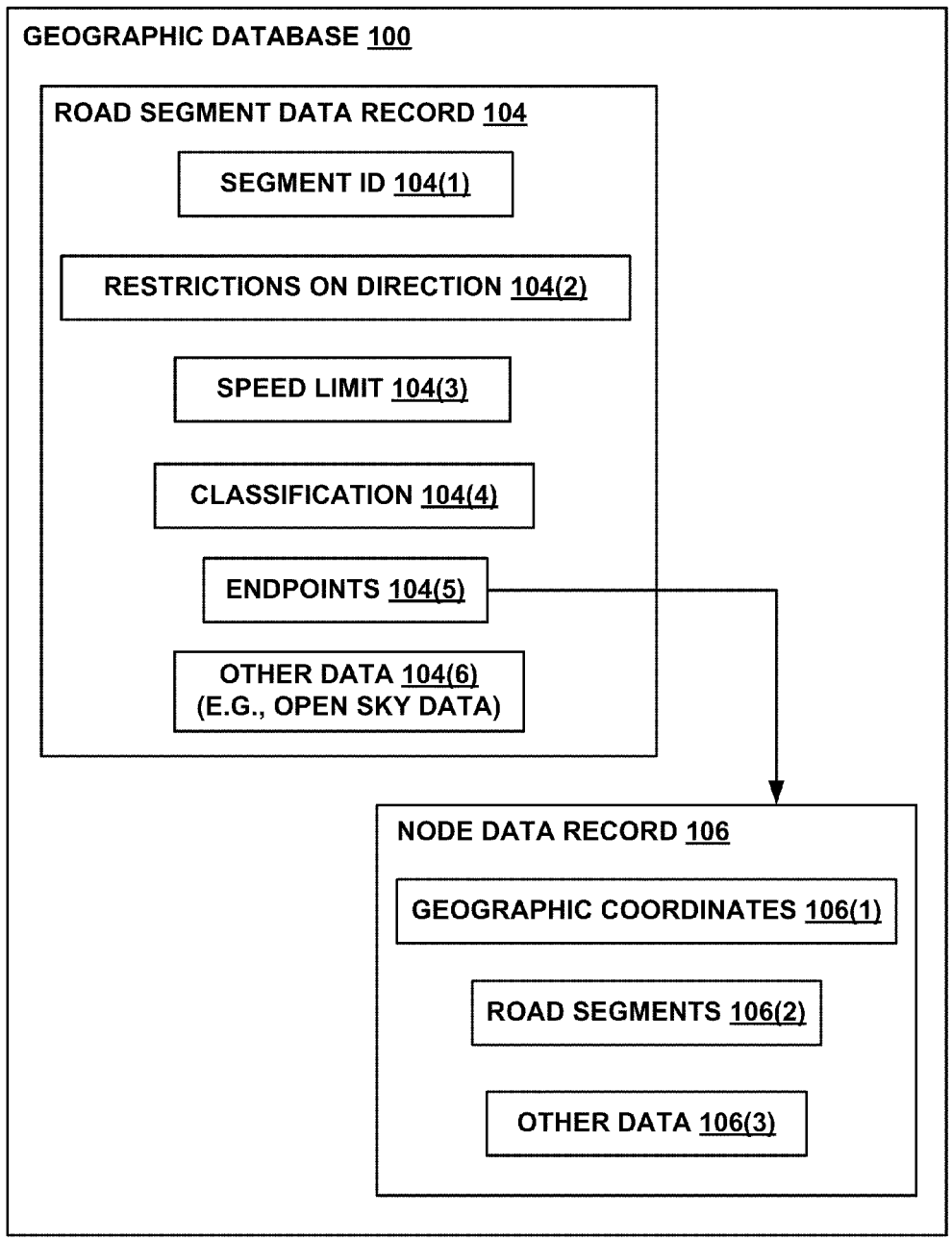
FIG. 7 shows some of the components of a road segment data record and a node data record contained in the geographic database of FIG. 5, according to an example embodiment.

FIG. 7 shows some of the components of a road segment data record 104 contained in the geographic database 100, according to an example embodiment. As shown, the road segment data record 104 may include or be associated with a segment ID 104(1) by which the data record can be identified in the geographic database 100 and data that indicates attributes of the represented road segment. The various attributes of a road segment may be included in a single road segment data record, or may be included in more than one type of road segment data record that cross-reference each other.

The data indicating the attributes of the represented road segment may take various forms. In one example, the road segment data record 104 may include or be associated with data 104(2) that indicates the restrictions, if any, on the direction of vehicular travel permitted on the represented road segment. In another example, the road segment data record 104 may include or be associated with data 104(3) that indicates a speed limit or speed category (i.e., the maximum permitted vehicular speed of travel) on the represented road segment. In yet another example, the road segment data record 104 may include or be associated with data 104(4) indicating a classification of the represented road segment, such as whether the represented road segment is part of a controlled access road (e.g., an expressway), a ramp to a controlled access road, a bridge, a tunnel, a toll road, a ferry, and so on. In still another example, the road segment data record 104 may include or be associated with data 104(5) identifying endpoints (e.g., geographic coordinates) of the represented road segment. In this respect, the data 104(5) may include a link to node data records 106 that represent the endpoint nodes of the represented road segment. Further, the data 104(5) may identify one endpoint as a reference node. In a further example, the road segment data record 104 may include or be associated with other data 104(6) that indicates other attributes of the represented road segment. Other examples are possible as well.

FIG. 7 also shows some of the components of a node data record 106 contained in the geographic database 100, according to an example embodiment. In one example, the node data record 106 may include or be associated with data identifying the represented node, such as data 106(1) that provides the geographic coordinates (e.g., latitude and longitude) of the represented node. In another example, the node data record 106 may include or be associated with data 106(2) identifying each road segment connected to the represented node. In yet another example, the node data record 106 may include or be associated with other data 106(3) that indicates other attributes of the represented node. Other examples are possible as well.

Referring back to FIG. 6, the geographic database 100 may also include other data records 108 that represent other kinds of geographic features or anything else in the geographic region 12. For example, the other data records 108 may include point-of-interest data records that each contain data indicating attributes of a represented point of interest, such as a type (e.g., restaurant, hotel, city hall, police station, historical marker, ATM, golf course, etc.), a location, a phone number, and/or hours of operation of the represented point of interest. As another example, the other data records 108 may include pedestrian-pathway segment and node data records that are similar to the road segment and node data records. Other examples are possible as well.

The geographic database 100 may additionally include indexes 110. The indexes 110 may include various types of indexes that associate different types of data contained in the geographic database 100 to each other or that associate to other aspects of the data contained in the geographic database 100. For example, the indexes 110 may associate node data records 106 with road segment data records 104. As another example, the indexes 110 may associate point of interest data records in the other data records 108 with road segment data records 104 and/or node data records 106. Other examples are possible as well.

Figure 8:
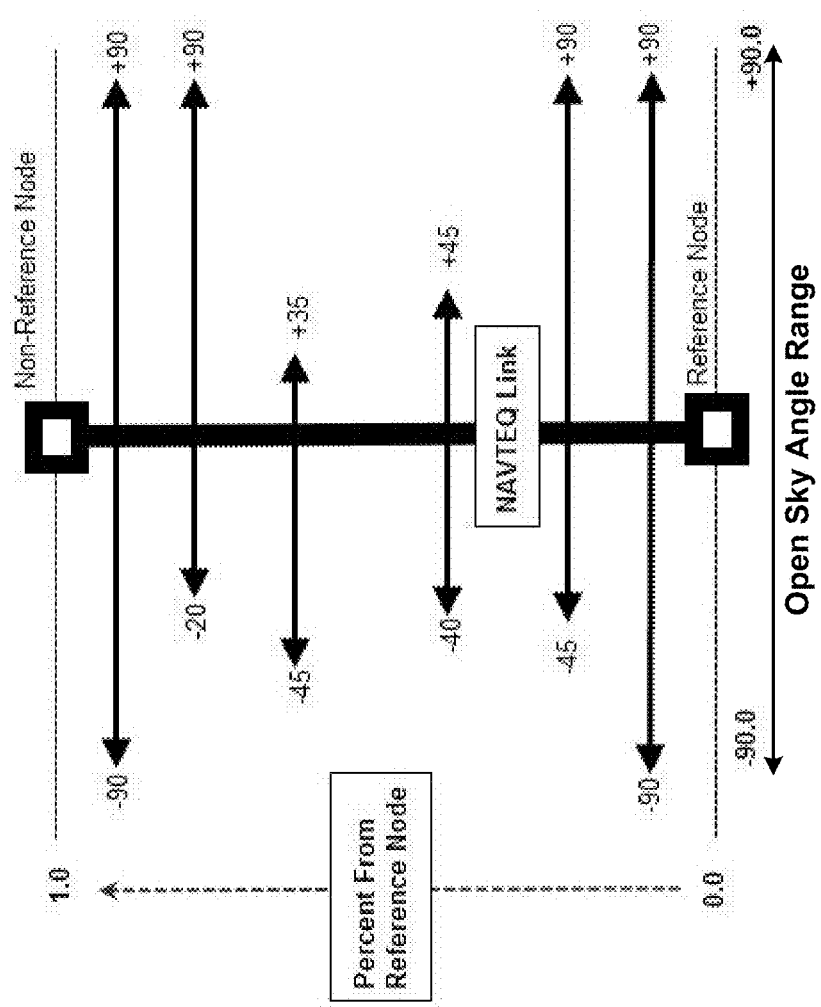
FIG. 8 is a visual representation of stored open sky data for a road segment, according to an example embodiment.

The open sky data generated by the computing device 60 may also be incorporated into the geographic database 100 and associated with the geographic data 102 in various manners. In one aspect, the geographic database 100 may maintain the open sky data in the other data records 108. For example, the other data records 108 may include one or more open sky data records, each containing an identifier of a position (e.g., a segment ID and percentage from the segment's reference node) and data indicating the visibility of open sky (e.g., a range of angles at which the open sky is visible) at the represented position. One such data record 108 is shown in Table 1 and depicted visually in FIG. 8.

TABLE 1

| Segment ID | % From Ref Node | Min Angle | Max Angle |
| --- | --- | --- | --- |
| 264098830 | 0% | −90 | 90 |
| 264098830 | 20% | −45 | 90 |
| 264098830 | 40% | −40 | 45 |
| 264098830 | 60% | −45 | 35 |
| 264098830 | 80% | −20 | 90 |
| 264098830 | 90% | −90 | 90 |

The open sky data records in the other data records 108 may then be associated with related road segment data records 104, node data records 106, and/or other data records 108 (e.g., point-of-interest data records, pedestrian-pathway data records, etc.) in various manners, such as via the indexes 110 and/or links in the records themselves.

In another aspect, the geographic database 100 may maintain the open sky data in the road segment data records 104. For example, the other data 104(6) in a road segment data record 104 may contain data indicating the visibility of open sky (e.g., a range of angles at which the open sky is visible) at one or more positions along the represented road segment 20. Other examples are possible as well.

The geographic data 102 may also be organized in the geographic database 100 in various manners. In one example, the geographic data 102 may be organized into different subsets or types of data that relate to different navigation-related functions, such as routing data, cartographic data (for map display), maneuver data, points-of-interest data, and open sky data. In another example, the geographic data 102 may be organized into different layers that relate to different levels of detail. In yet another example, the geographic data 102 may be organized to facilitate spatial access. Other examples are possible as well.

IV. Navigation System

Figure 9:
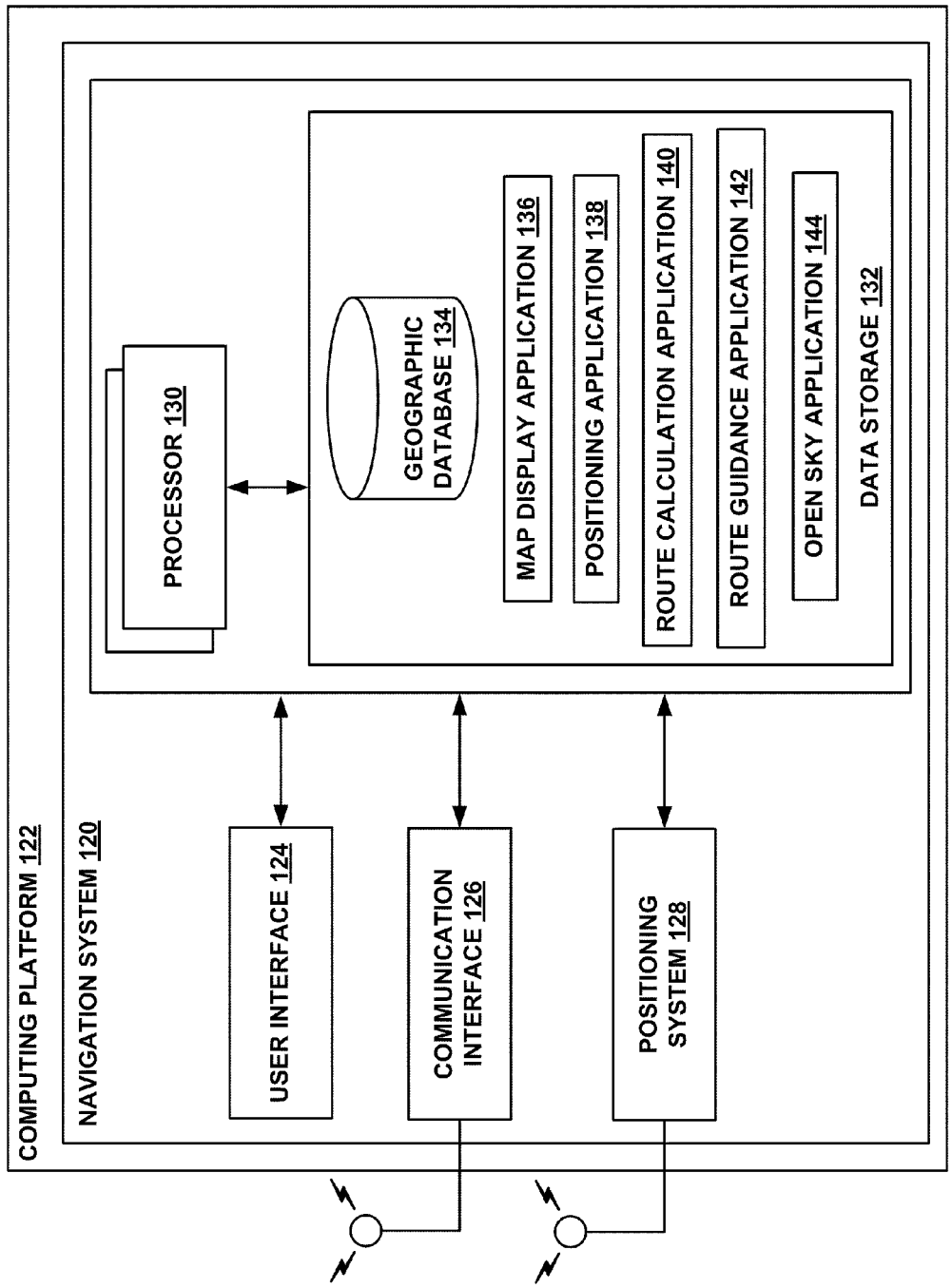
FIG. 9 is a block diagram of a navigation system, according to an example embodiment.

As described above, the geographic data generated by the computing device 60 and stored in geographic database may also be used by a navigation system to provide users with navigation-related functions and features. FIG. 9 is a block diagram of a navigation system 120, according to an example embodiment. The navigation system 120 may be associated with a computing platform 122, such as a vehicle-installed computing device, a personal digital assistant (PDA), a mobile telephone, a personal computer, or another computing device. The navigation system 120 is a combination of hardware and software components. As shown, the navigation system 120 may include a user interface 124, a communication interface 126, and a positioning system 128, each operatively coupled to a processor 130 and data storage 132. The navigation system 120 may include other components as well.

The user interface 124 may function to facilitate user interaction with the navigation system 120, such as by allowing a user to input information into the navigation system 120 and obtain information from the navigation system 120. In this respect, the user interface 124 may include or provide connectivity to various input components, such as a touch screen and/or a microphone for instance. The user interface 124 may also include or provide connectivity to various output components, such as a display screen and/or a speaker for instance. The user interface 124 may include or provide connectivity to other components for facilitating user interaction with the navigation system 120 as well.

The communication interface 126 may function to communicatively couple the navigation system 120 to one or more other devices, such as a device maintaining the geographic database 100. In this respect, the communication interface 126 may take the form of one or more interfaces that provide for wireless and/or wired communication with another device, such as an Ethernet interface, a serial bus interfaces (e.g., Firewire, USB 2.0, etc.), a chipset and antenna adapted to facilitate wireless communication according a desired protocol, or any other such interfaces now known or later developed. Other configurations are also possible.

The positioning system 128 may function to track and generate position data representing a position of the computing platform 122. In this respect, the positioning system 128 may employ any technology now known or later developed, including GPS-type technology, dead reckoning-type technology, or a combination of these or other technologies, all of which are known in the art. Further, the positioning system 128 may include various components, including a GPS receiver, an IMU, and/or any other device that enables tracking of the computing platform's position. Further yet, the position data may take various forms, including data indicating geographic coordinates (latitude, longitude, and altitude), direction, orientation, and/or speed of the computing platform 122 for instance.

The processor 130 may function to execute or interpret program instructions (which may be arranged into an application) that enable the processor 130 to carry out various tasks, including tasks related to providing navigation-related functions and features. In this respect, the processor 66 may take the form of one or more processor components, such as general-purpose processors (e.g., a microprocessor), application-specific processors (e.g., an ASIC or DSP), programmable logic devices (e.g., a FPGA), or other processor components now known or later developed. Other configurations are possible as well.

The data storage 132 may function to store various types of program instructions and data that can be read by the processor 130, such as applications, geographic data, and/or data from the user interface 124, the communication interface 126, and/or the positioning system 128. In this respect, the data storage 132 may take the form of one or more data storage mediums, such as volatile data storage mediums (e.g., RAM, registers, and/or cache) and/or non-volatile data storage mediums (e.g., ROM, a hard disk drive, a solid state drive, flash memory, an optical storage device, and/or a floppy disk). Some data storage mediums may be integrated in whole or in part with the processor 130. Further, some data storage mediums may be external to and/or removable from the navigation system 120, and may interface with the navigation system 120 in various manners (e.g., via the communication interface 126, a drive, or a reader). Other configurations are possible as well.

The data storage 132 may contain a geographic database 134, which may be generated from the geographic database 100 described above. The geographic database 134 may be in various formats, such as a graphical data file (GDF) or a standard interchange format (SIF). In one embodiment, the geographic database 134 may be a geographic database published by NAVTEQ North America, LLC of Chicago, Ill. The geographic database 134 may be stored in various components of the data storage 132. For example, the geographic database 134 may be stored in a non-volatile data storage medium (e.g., a hard disk drive or a removable storage component installed in a drive) and then loaded into a volatile data storage medium (e.g., RAM) when operated on by the processor 130. Other examples are possible as well. In an alternative aspect, the geographic database 134 may be stored remotely from the navigation system 120, in which case the navigation system 120 may access the geographic database 134 via the communication interface 126. Other examples are possible as well.

The data storage 132 may contain one or more applications that enable the processor 130 to perform various tasks related to providing navigation-related features and functions to a user. When executing the one or more applications, the processor 130 may use data from the geographic database 134 and perhaps data from the user interface 124, the communication interface 126, and/or the positioning system 128. The one or more applications may be stored in various components of the data storage 132. For example, the one or more applications may be stored in a non-volatile data storage medium (e.g., a hard disk drive or a removable storage component installed in a drive) and then loaded into a volatile data storage medium (e.g., RAM) when operated on by the processor 130. Other examples are possible as well.

In one aspect, the data storage 132 may contain a map display application 136 that enables the processor 130 to display a map of the geographic region 12 (or a portion thereof) to a user. In conjunction with the display application 136, the data storage 132 may also contain a positioning application 138 that enables the processor 130 to display the computing platform's current position on a map.

In another aspect, the data storage 132 may contain a route calculation application 140 that enables the processor 130 to determine a route from an origin to a destination. For example, the processor 130 executing the route calculation 138 may determine a route from the computing platform's current position as determined via the positioning system 128 to a position input by a user via the user interface 124. Other examples are possible as well. In conjunction with the route calculation application 140, the data storage 132 may also contain a route guidance application 142 that enables the processor to provide a user with detailed directions for reaching the destination.

In yet another aspect, the data storage 132 may contain an open sky application 144 that enables the processor 130 to use the open sky data for various purposes. For example, the processor 130 executing the open sky application 144 may use the open sky data to identify positions having good or bad visibility of the open sky. In this respect, the processor 130 executing the open sky application 144 may also provide a user with an identification of the positions having good or bad visibility via the user interface 124.

In another example, the processor 130 executing the open sky application 144 may use the open sky data and perhaps other data (position data, date/time, and/or GPS satellite information) to determine GPS signal availability information for various positions, such as the computing platform's current position and potential future positions. For instance, the processor 130 executing the open sky application 144 may determine which GPS satellites are currently visible and where those satellites will become obstructed; which GPS satellites are currently obstructed and where those satellites will become visible; where GPS signals will be completely unavailable; and where GPS signals will experience multipath errors. Using this information, the processor 130 executing the open sky application 144 may anticipate and perhaps compensate for a loss or degradation of GPS signals. The processor 130 executing the open sky application 144 may also provide a user with GPS signal availability information via the user interface 124.

In a similar example, the processor 130 executing the open sky application 144 may use the open sky data and perhaps other data (position data, date/time, and/or radio antenna information) to determine radio signal availability information for various positions, such as the computing platform's current position and potential future positions. For instance, the processor 130 executing the open sky application 144 may determine which radio antennas are currently visible and where those antennas will become obstructed; which radio antennas are currently obstructed and where those antennas will become visible; where radio signals will be completely unavailable; and where radio signals will experience multipath errors. Using this information, the processor 130 executing the open sky application 144 may anticipate and perhaps compensate for a loss or degradation of radio signals. The processor 130 executing the open sky application 144 may also provide a user with radio signal availability information via the user interface 124.

In another example, the processor 130 executing the open sky application 144 may use the open sky data and perhaps other data (e.g., position data, date/time) to determine exposure to weather conditions (e.g., sun, rain, snow) at various positions, such as the computing platform's current position and potential future positions. Using this information, the processor 130 executing the open sky application 144 may provide a user with an identification of (and perhaps directions to) positions that are exposed to or sheltered from a given weather condition, both on and off the road network 18. For instance, the processor 130 executing the open sky application 144 may provide a user with an identification of a parking location that is sheltered from weather conditions. Additionally, using this information, the processor 130 executing the open sky application 144 may also identify positions at which sun glare may affect drivers.

As described above, the processor 130 executing the open sky application 144 may use the open sky data for various purposes, such as providing a navigation system user with information regarding visibility, GPS or radio signal strength, and sun glare. The processor 130 may execute the map display application 136, the route calculation application 140, and/or the route guidance application 142 in conjunction with the open sky application 144. As a result, the processor 130 may provide navigation guidance to the user that allows the users to select and obtain guidance for traveling a route based on open sky data. For example, the user may select a route that has the best GPS signal availability or avoid a route with limited visibility.

In a related example, the processor 130 executing the open sky application 144 may use the open sky data and perhaps other data (e.g., position data, date/time) to predict solar energy at various positions, such as the computing platform's current position and potential future positions. Using this information, the processor 130 executing the open sky application 144 may provide improved route guidance to solar powered cars. Other examples are possible as well.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method of generating data representing open sky, the method comprising:
    obtaining range data associated with a given position;
    using the range data associated with the given position to generate data at a processor, the data representing visibility of open sky at the given position; and
    storing into data storage the data representing the visibility of open sky at the given position,
    wherein the data representing the visibility of open sky at the given position comprises data indicating one or more ranges of angles at which the open sky is visible from the given position and the visibility data includes a partial visibility rating associated with the one or more angles at which the open sky is partially visible from the given position.

2. The method of claim 1, wherein the range data comprises a plurality of data records, each data record representing attributes of a respective pulse transmitted by a range-finding device at the given position.

3. The method of claim 2, wherein the attributes of the respective pulse comprise a transmission angle of the pulse and a distance of a physical object encountered by the pulse.

4. The method of claim 1, wherein using the range data associated with the given position to generate visibility data representing visibility of open sky at the given position comprises:
    analyzing the obtained range data to determine transmission angles of pulses transmitted at the given position that did not encounter a physical object;
    using the determined transmission angles of pulses transmitted at the given position that did not encounter a physical object to determine visibility of open sky at the given position; and
    generating visibility data representing the determined visibility of the open sky at the given position.

5. The method of claim 4, further comprising:
    before generating visibility data representing the determined visibility of the open sky at the given position, using video data associated with the given position to verify the determined visibility of open sky at the given position.

6. The method of claim 4, wherein analyzing the obtained range data to determine transmission angles of pulses transmitted at the given position that did not encounter a physical object comprises:
    for a given pulse transmitted at the given position, analyzing a data value indicating a distance of a physical object encountered by the given pulse; and
    if the data value is a null, identifying a transmission angle the given pulse as a transmission angle of a pulse that did not encounter a physical object.

7. The method of claim 4, wherein analyzing the obtained range data to determine transmission angles of pulses transmitted at the given position that did not encounter a physical object comprises:
    analyzing the obtained range data to identify gaps in the transmission angles of pulses transmitted at the given position that encountered a physical object; and
    identifying transmission angles within the identified gaps as transmission angles of pulses that did not encounter a physical object.

8. The method of claim 1, wherein the visibility data representing the visibility of open sky at the given position further comprises one or more of data indicating a distance of a physical object at each edge of each range of angles.

9. The method of claim 1, wherein storing into data storage the visibility data representing the visibility of open sky at the given position comprises associating the visibility data representing the visibility of open sky at the given position with data representing physical features at the given position.

10. The method of claim 9, wherein the physical features comprise a road network and points of interest.

11. The method of claim 1, wherein storing into data storage the visibility data representing the visibility of open sky at the given position comprises storing into data storage the visibility data representing the visibility of open sky at the given position only if the visibility data representing the visibility of open sky at the given position indicates a change exceeding a threshold in the visibility of open sky from a previous position.

12. The method of claim 1, further comprising:
before obtaining range data associated with the given position, selecting positions on a road network in a geographic region to obtain range data.

13. The method of claim 1, further comprising:
providing the visibility data representing the visibility of open sky at the given position to a navigation system.

14. An apparatus comprising:
a processor; and
a memory including computer program instructions, the memory and the computer program instructions configured to:
obtain range data associated with a given position;
use the range data associated with the given position to generate data representing visibility of open sky at the given position;
store into data storage the data representing the visibility of open sky at the given position, wherein the data representing the visibility of open sky at the given position comprises data indicating one or more ranges of angles at which the open sky is visible from the given position; and
generate a route navigation based on the data representing the visibility of open sky.

15. The apparatus of claim 14, wherein the range data comprises a plurality of data records, each data record representing attributes of a respective pulse transmitted by a range-finding device at the given position, and wherein the attributes of the respective pulse comprise a transmission angle of the pulse and a distance of a physical object encountered by the pulse.

16. The apparatus of claim 14, wherein the memory and computer program instructions are further configured to:
analyze the obtained range data to determine transmission angles of pulses transmitted at the given position that did not encounter a physical object;
use the determined transmission angles of pulses transmitted at the given position that did not encounter a physical object to determine visibility of open sky at the given position; and
generate data representing the determined visibility of the open sky at the given position.

17. The apparatus of claim 16, wherein the memory and computer program instructions are further configured to:
before generating data representing the determined visibility of the open sky at the given position, using video data associated with the given position to verify the determined visibility of open sky at the given position.

18. The apparatus of claim 16, wherein the memory and computer program instructions are further configured to:
for a given pulse transmitted at the given position, analyze a data value indicating a distance of a physical object encountered by the given pulse; and
if the data value is a null, identify a transmission angle the given pulse as a transmission angle of a pulse that did not encounter a physical object.

19. The apparatus of claim 14, wherein the route navigation is based on a prediction of solar energy.

20. The apparatus of claim 14, wherein the route navigation is selected for a solar power car based on the data representing the visibility of open sky.

21. The apparatus of claim 14, wherein the data representing the visibility of open sky at the given position comprises at least one partial visibility rating.

22. The apparatus of claim 14, wherein the route navigation is based on exposure to weather conditions.

23. The apparatus of claim 14, wherein the route navigation includes identification of a parking location that is sheltered from weather based on the data representing the visibility of open sky.

* * * * *